April 20, 1926.
H. P. DONLE
HEATER PAD
Filed July 16, 1925
1,581,429
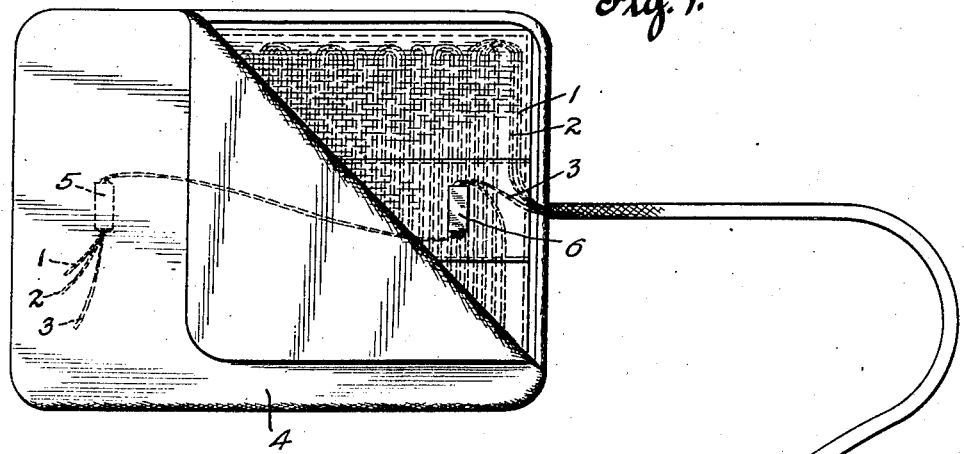
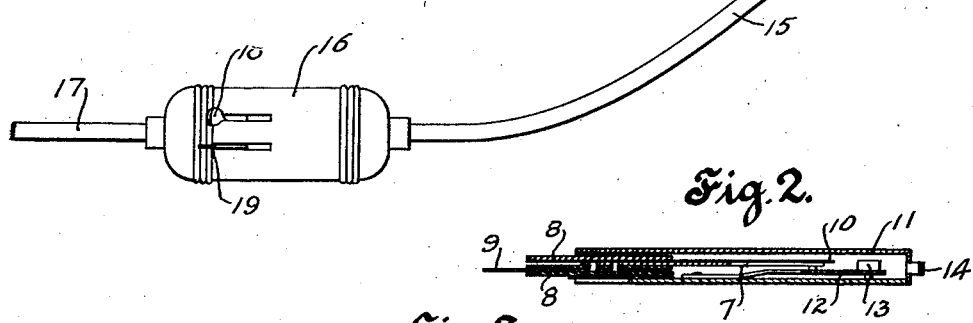
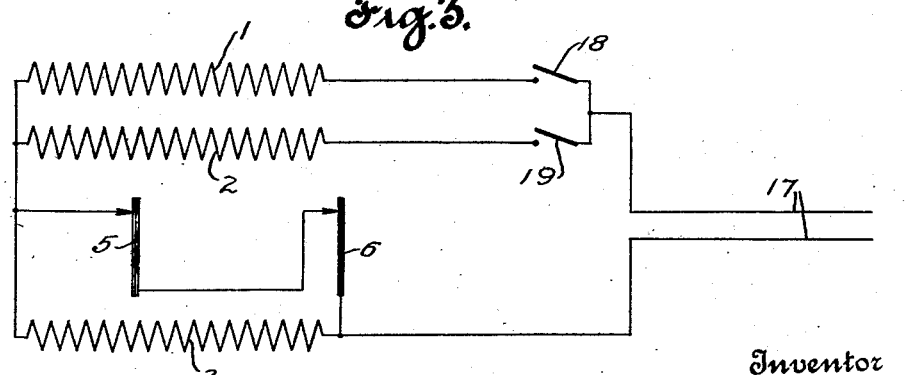
Inventor
Harold P. Donle
By his Attorneys
Mitchell & Bechert Patented Apr. 20, 1926.

1,581,429

UNITED STATES PATENT OFFICE.

HAROLD P. DONLE, OF MERIDEN, CONNECTICUT, ASSIGNOR TO THE CONNECTICUT TELEPHONE & ELECTRIC COMPANY, INCORPORATED, OF MERIDEN, CONNECTICUT, A CORPORATION OF CONNECTICUT.

HEATER PAD.

Application filed July 16, 1925. Serial No. 43,915.

*To all whom it may concern:*

Be it known that I, HAROLD P. DONLE, a citizen of the United States of America, residing at Meriden, Connecticut, have invented a new and useful Heater Pad, of which the following is specification.

My invention relates to a heating device particularly adapted for use in a heating pad.

As now generally constructed, heating pads and the like are provided with one or more resistance heating elements having one or more thermostats in circuit therewith. When the heating element reaches a predetermined temperature, the thermostat opens the circuit and the heating element then cools off until such time as the thermostat again closes the circuit. Such heating pads are subject to substantial variations in temperature due to the fact that the circuit is completely opened when the thermostat acts and the thermostat in acting must break substantially the full line voltage. Again, with such heating pads, the thermostat must act at relatively frequent intervals if the pad is to be kept at a fairly uniform temperature. It has also been found with such heating pads that considerable trouble is experienced with radio apparatus in proximity to such heating pads when the thermostat breaks the circuit.

It is the principal object of the invention, therefore, to overcome in a large measure the difficulties above enumerated, and to improve the construction of a heating device of the character indicated and to construct the same in such manner that the thermostatic means will act only at relatively long intervals and the thermostat will not be called upon to break the full line voltage when opening a circuit. Other minor objects and the features of the invention will be apparent from the following specification:

Briefly stated, in the preferred form of the invention, I employ one or more resistance heating elements and one or more switches may be employed for opening and closing the circuit through the respective heating elements in order to regulate the heating effect of the device. One or more thermostats are connected in series with the heating resistances. Another resistance element is connected in the circuit in parallel with the thermostat so that it in fact short circuits the thermostat and when the temperature rises above a predetermined point, the thermostat opens a circuit and the resistance element is then in series with the heating resistance element and the current through the heating resistance element is thus reduced.

In the drawings which show, for illustrative purposes only, a preferred form of the invention—

Fig. 1 is a more or less diagrammatic view of a heating pad embodying features of the invention;

Fig. 2 is a central sectional view through a thermostat;

Fig. 3 is a diagram of the electrical connections in a heating device of the character indicated.

In said drawings, 1, 2, and 3 designate resistance elements which in the preferred form are asbestos covered wires cabled together and woven, preferably with asbestos yarn, into a mat which may be encased in a suitable case or heater pad body member or of flannel or similar material. In Fig. 1 the resistance elements are shown relatively separated but this is for the sake of clear illustration it being contemplated that in practice the elements will be cabled together as above described.

In order to control the temperature in the heater pad, I employ one or more thermostats 5—6 which may be duplicates of each other. Any suitable type of thermostat that will function satisfactorily may be employed. By way of illustration, I show a thermostatic member such as a bi-metallic plate 7 held between insulating plates 8—8 which plates may also serve to hold a terminal 9 connected to the thermostatic plate 7 by means of rivets or the like, as shown particularly in Fig. 2. A shield of mica or the like 10 may be interposed between the plate 7 and the metallic case 11 enclosing the thermostatic element. The case 11 may have a spring contact 12 which may be adjusted as by means of a screw 13 to vary the point of engagement of the contact point on the bi-metallic element 7 with the contact arm 12. 14 indicates a struck-up portion for forming a connection to the case and it will thus be seen that the circuit is made from the terminal plate 9 through the thermostatic plate 7, contact point on the end thereof, the spring contact 12, case 11 and terminal 14. While one thermostat would provide an operative device it is desirable to have a plurality of thermostats in series with each other so that if by any chance one thermostat should fail to operate, another would be likely to operate and thus avoid injury to the person or thing in contact with the heating device.

In the form shown, the three resistance elements 1, 2, and 3 pass to the outside of the pad body 4 and are connected to a three element cord 15 which connects to suitable switch mechanism in the case 16. 17 indicates the line wires leading to the switch. The switch, the details of which need not be shown since such switches are now in common use, serve to open or close the circuits through the wires 1 or 2, or both, depending upon the position of the switch members 18—19 indicated diagrammatically in Fig. 3 and depending upon the temperature desired, it being understood that the resistances 1 and 2 are preferably different so that resistance 1 may be employed for one temperature, resistance 2 for a different temperature, and resistances 1 and 2 for a maximum temperature.

The heating resistances 1—2 are connected in parallel so that either one or both may be placed in the circuit. The thermostat or thermostats 5—6 are in parallel with the third resistance 3 and these elements are in series with the resistance heating elements 1—2 diagrammatically shown in Fig. 3.

The operation of the device is as follows:
Assume, for example, the switch 18 closed. The circuit will then include one line wire 17, the resistance element 1, the thermostats 5—6, and the other line wire 17. When the temperature reaches a predetermined point, one or the other, or both, thermostats will act to open the circuit and at the same time the resistance 3 will then become the sole return path for the current, and the current through the heating element 1 will thus be reduced and the heating effect thereby reduced. As soon as the temperature drops sufficiently, the theremostat which previously opened, will again close the circuit and more current will then pass through the heating resistance 1 and the pad will again heat up.

Since heating resistances 1 and 2 are connected in parallel, obviously by manipulating the switches 18—19, either or both of the heating resistances may be thrown into the circuit for securing different degrees of temperature in the heating pad.

Since the resistance 3 is in parallel with the thermostatic device and in effect short circuits the same, it will be clear that the thermostat will be called upon to break a voltage less than the full line voltage and danger of arcing and burning at the thermostat contact point will thus in a large measure be avoided. It has been found in practice that the ill effects on radio apparatus experienced upon the opening of a thermostat breaking substantially the full line voltage is, by my invention, reduced to a negligible quantity. It will also be plain that when the thermostat acts, the circuit through the heating resistance is not completely opened but some current is permitted to flow through the heating resistance and the drop in temperature therein is thus comparatively slow and therefore the thermostat will be called upon to operate less frequently than if the circuit were completely broken.

It will be observed that by my invention, I am enabled to produce a heating device in which the temperature change will be comparatively slow and the thermostat will be called upon to operate at only correspondingly long intervals and will be caused to break a voltage less than the full line voltage, thus avoiding arcing and burning out of the contact points in the thermostatic device.

While the invention has been described in some detail, I do not wish to be strictly limited to the form shown since changes may be made within the scope of my invention as defined in the appended claims.

I claim—

1. In a heating device, a plurality of resistance heating elements connected in parallel, circuit closing means for said heating elements, a thermostat in series with said heating elements, another resistance element in parallel with said thermostat and in series with said heating resistance elements, whereby when the thermostat opens the circuit, the current flow will be through said resistance element which is in parallel with said thermostat and the current through all the resistance elements reduced.

2. In a heating device, a resistance heating element, a plurality of thermostats in series with said heating element, and a resistance element in parallel with both of said thermostats, whereby when either of said thermostats opens the circuit, the last mentioned resistance element will be connected in series with the heating resistance element to reduce the current through the circuit.

3. In a heater pad, a pad body, a plurality of resistance elements insulated from each other and cabled together and woven into a mat, said mat being secured in the pad body, a plurality of thermostats in said body and connected in series, one of said resistance elements being connected in parallel with said thermostats and in series with the other resistance elements.

HAROLD P. DONLE.